United States Patent
Wang

(10) Patent No.: US 9,829,403 B2
(45) Date of Patent: Nov. 28, 2017

(54) STRUCTURE OF PRESSURE GAUGE

(71) Applicant: Ru-Wen Wang, Tainan (TW)

(72) Inventor: Ru-Wen Wang, Tainan (TW)

(*) Notice: Subject to any disclaimer, the term of this patent is extended or adjusted under 35 U.S.C. 154(b) by 156 days.

(21) Appl. No.: 14/992,031

(22) Filed: Jan. 11, 2016

(65) Prior Publication Data

US 2016/0123825 A1    May 5, 2016

(51) Int. Cl.
| | | |
|---|---|---|
| *G01L 7/08* | (2006.01) | |
| *G01L 7/06* | (2006.01) | |
| *G01L 19/14* | (2006.01) | |
| *G01L 19/16* | (2006.01) | |

(52) U.S. Cl.
CPC ............ *G01L 7/063* (2013.01); *G01L 7/084* (2013.01); *G01L 19/147* (2013.01); *G01L 19/16* (2013.01)

(58) Field of Classification Search
CPC ................................ G01L 7/063; G01L 7/084
See application file for complete search history.

(56) References Cited

U.S. PATENT DOCUMENTS

| | | | | |
|---|---|---|---|---|
| 1,924,091 A * | 8/1933 | Eisenhour | ............... | G01L 7/063 73/646 |
| 2,437,371 A * | 3/1948 | Allen | ...................... | G01L 7/063 73/729.1 |
| 3,094,876 A * | 6/1963 | Hastings | ................. | G01L 7/084 73/716 |
| 2014/0299044 A1* | 10/2014 | Wang | ...................... | G01L 7/084 116/271 |
| 2015/0185097 A1* | 7/2015 | Huang | ...................... | G01L 7/08 73/715 |

* cited by examiner

*Primary Examiner* — Daniel J Colilla

(57) ABSTRACT

An improved structure of pressure gauge includes a bottom case, a pressure measurement assembly, a rotating assembly, a fulcrum piece, a coil spring, a scale meter, and an outer case. The pressure measurement assembly is installed above the bottom case and the surface thereof is shaped with concentric circular waves. The rotating assembly includes a sleeve body and a central rod. A fulcrum piece is installed across between the sleeve body and the central rod. A plurality of through holes and a coil retaining base are provided on the fulcrum piece. One end of the coil spring is screwed onto the coil slot and the other end thereof is installed on the coil retaining base. The outer case is located in the outer area of the bottom case and the fulcrum piece. A transparent cover body is installed on top of the outer case.

10 Claims, 6 Drawing Sheets

STRUCTURE OF PRESSURE GAUGE

BACKGROUND OF THE INVENTION

1. Field of the Invention

The invention relates to an improved structure of pressure gauge, which makes the measurement elements stronger and more firm, and achieves excellent stability and high practicality.

2. Description of Related Art

Applications of pressure gauges cover a vast variety of fields and pressure gauges are indispensable items for industry and daily life, such as applications frequently applied in pressure measurement of oil pressure, vacuum, atmospheric pressure, gas pressure, sea-level altitude and diving depth.

Referring to FIG. 1, FIG. 1 is a schematic sectional side view of a pressure gauge of the prior art. The pressure gauge 1 commonly used these days mainly consists of a base 10, wherein a pressure measurement assembly 11 is installed inside the base 10 and a scale plate 12 is installed above the base 10. A guide shaft 13 is installed at the center of the pressure measurement assembly 11 and a spiral base 130 is wrapped closely around the outer of the guide shaft. The hole of the guide shift 13 is plugged with a rod 140 whose upper portion is equipped with a rotating piece 14. The lower portion of the rod 140 is coupled with a bar for holding against the adjacent spiral base 130. The scale plate 12 is locked by a screw, which is fastened through a support base, above the base 10. A transparent cover 17 is installed on top of the base 10 and the transparent cover 17 is located above the scale plate 12 to form a covering for protection of the scale plate 12.

The aforementioned rotating piece 14 installed above the base 10 of the pressure gauge 1 has a coil spring and holds the rod against one end of the support base 16 for the purpose of a fixed position, therefore, resulting in frequent unsmooth rotation of the pointer, which is installed on to the rotating piece and making zero setting hard to perform.

SUMMARY OF THE INVENTION

The main objective of the invention is to provide an improved structure of pressure gauge with a simple and concise structure that is easy to assemble, makes the structural relation more stable and firm, and is easier to obtain an accurate pressure measurement.

Based on the aforementioned objective, the improved structure of pressure gauge of the invention comprises a bottom case, a pressure measurement assembly, a rotating assembly, a fulcrum piece, a coil spring, a scale meter, and an outer case. The peripheral edge of the bottom case protrudes upward to form a ring base and the bottom case has a pipeline for gas to circulate wherein a seal pad is installed on the ring base around the peripheral edge of the bottom case.

The pressure measurement assembly is installed above the seal pad and the surface thereof is shaped with a plurality of concentric circular waves wherein the pressure measurement assembly is a diaphragm.

The rotating assembly comprises a sleeve body and a central rod. The sleeve body is installed at and connected to the central location of the pressure measurement assembly; the inside of the sleeve body is formed with two protruding knobs; the central rod is plugged into the sleeve body; the side skirt of the central rod has a thread part; the upper area of the central rod is formed with a coil slot; the top end of the central rod protrudes upward and is installed with a pointer rod; a rotating piece is used to drive the pointer rod; a pointer is installed on the pointer rod wherein the thread part is double-threaded and formed by winding two wires around the same rod so that the manufacturing process is much simpler and the cost is lesser.

The fulcrum piece is installed across between the central rod and the pointer rod. The fulcrum piece has a plurality of through holes for installation and penetrating through and is formed with a coil retaining base at one end close to the central rod.

One end of the coil spring is screwed onto the coil slot; the other end of the coil spring is installed on the coil retaining base.

The scale meter is installed between the pointer rod and the pointer and has a through hole that is correspondent to the through hole on the fulcrum piece.

The outer case is installed outside the bottom case and the fulcrum piece; a transparent cover body is installed on top of the outer case.

Therefore, when the sleeve body is driven by the pressure measurement assembly to move, two protruding knobs are spirally screwed in the thread part and the protruding knobs force the thread part to rotate. As the thread part rotates, the rotating piece will cause the pointer rod to rotate together. As a result, the setting can easily make the pointer installed on the pointer rod to move and achieve better stability and accuracy.

In addition, the rotating assembly of the invention can be a different form. The rotating assembly remains the same to comprise a sleeve body and a central rod. The main differences are that the inside of the sleeve body is formed with a spiral part of a spiral shape; the side skirt of the central rod has a thread part to be spirally screwed in the spiral part wherein the thread part is double-threaded.

Furthermore, the pressure measurement assembly of the invention can be vertical bellows and a pad block can be installed underneath the bellows. The bellows is of high sensitivity and therefore can measure extremely low pressure such as the atmospheric pressure.

The above and other objects, features and advantages of the invention will become apparent from the following detailed description taken with the accompanying drawings.

DETAILED DESCRIPTION OF THE INVENTION

Figure 1:
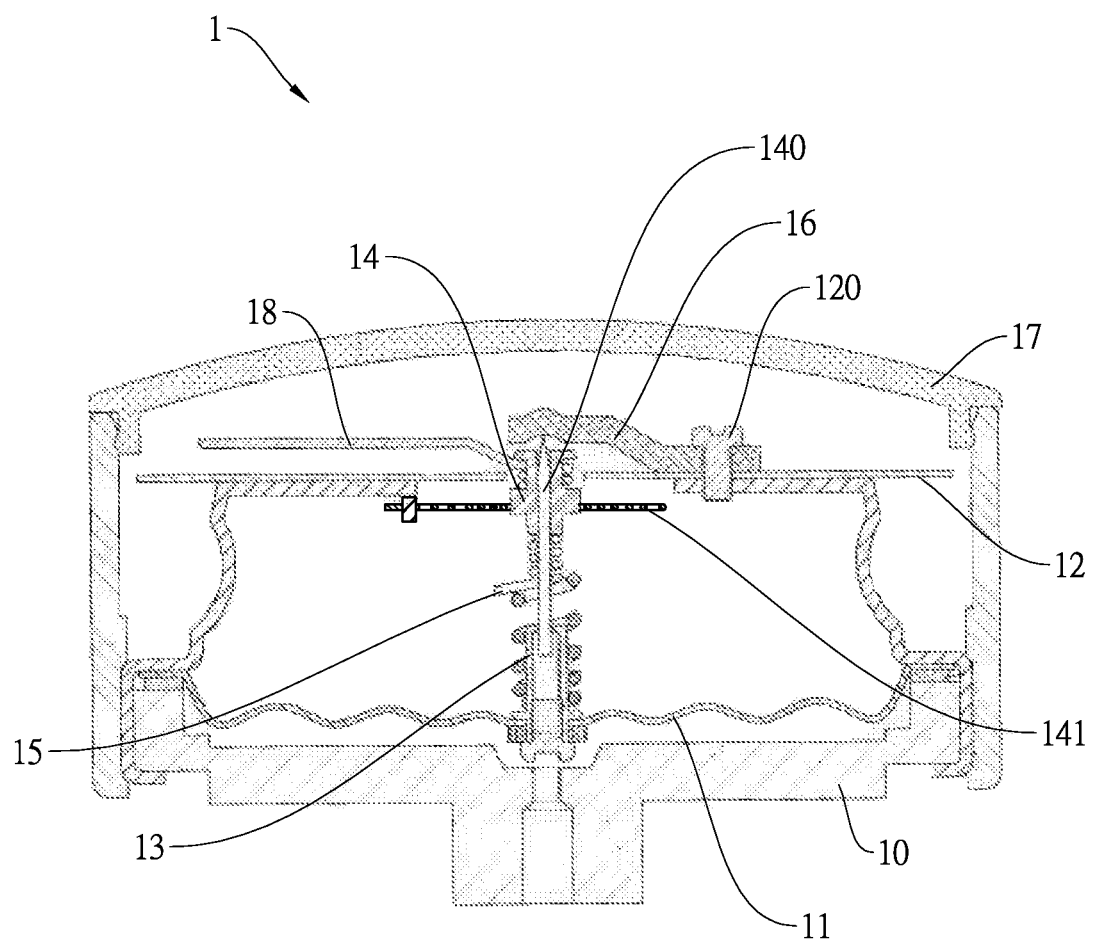
FIG. 1 is a schematic sectional side view of a pressure gauge of the prior art.
Figure 2:
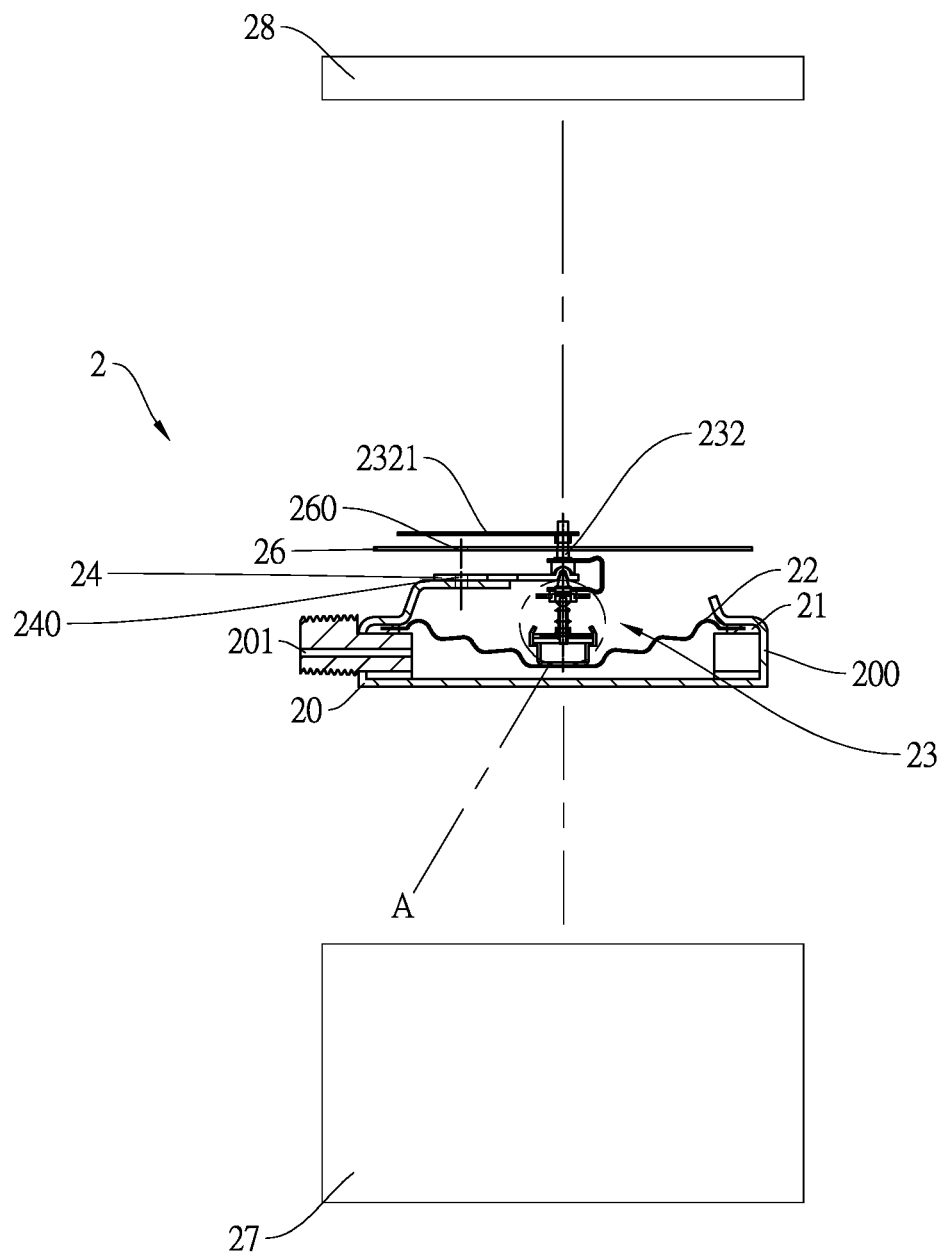
FIG. 2 is a schematic sectional view of the improved structure of pressure gauge of the invention.
Figure 3:
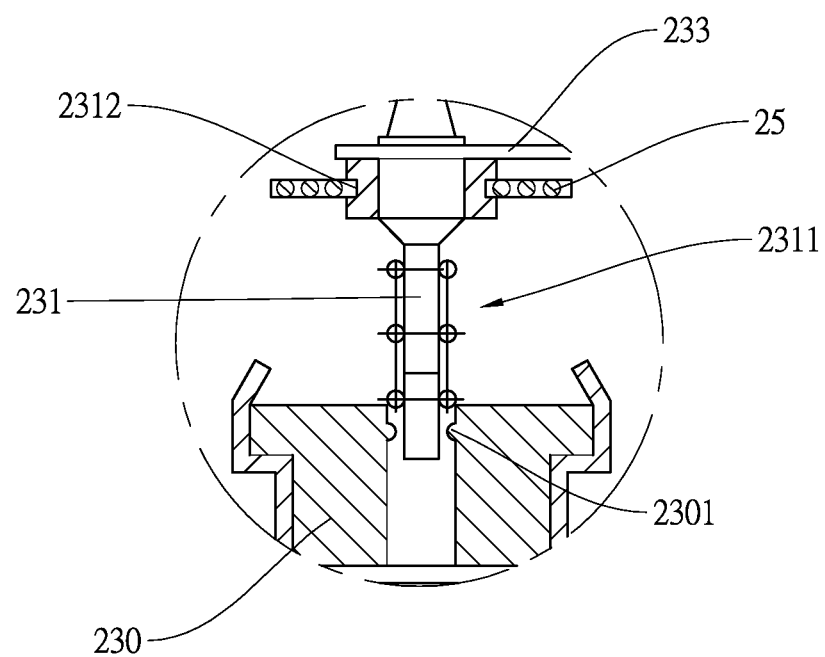
FIG. 3 is a detailed view of the area in circle A in FIG. 2.

Referring to FIG. 2 and FIG. 3, a pressure gauge 2 of the invention comprises a bottom case 20, wherein it peripheral edge of the bottom case 20 protrudes upward to form a ring base 200 and the bottom case has a pipeline 201 for the gas to circulate wherein a seal pad 21 is installed on the ring base 200 around the peripheral edge of the bottom case 20; a pressure measurement assembly 22, installed above the seal pad 21 and having its surface shaped with a plurality of concentric circular waves, wherein the pressure measurement assembly 22 is a diaphragm; a rotating assembly 23, which comprises a sleeve body 230 and a central rod 231, wherein the sleeve body 230 is installed at and connected to the central location of the pressure measurement assembly 22; the inside of the sleeve body 230 is formed with two protruding knobs 2301; the central rod 231 is plugged into the sleeve body 230; the side skirt of the central rod 231 has a thread part 2311 so that the thread part 2311 can be occluded with two protruding knobs 2301; the upper area of the central rod 231 is formed with a coil slot 2312; the top end of the central rod 231 protrudes upward and is installed with a pointer rod 232; through the use of a rotating piece 233, the central rod 231 drives the pointer rod 232 to rotate; a pointer 2321 is installed on the pointer rod 232; a fulcrum piece 24, which is installed across between the central rod 231 and the pointer rod 232, wherein the fulcrum piece 24 has a plurality of through holes 240 for installation and penetrating through and is formed with a coil retraining base (not shown in the figure) at one end close to the central rod 231; a coil spring 25, which is screwed onto the coil clot 2312 and the other end of the coil spring is installed on the coil retaining base (not shown in the figure); a scale meter 26, which is installed between the pointer rod 232 and the pointer 2321 and has a through hole 260 that is correspondent to the through hole 240 on the fulcrum piece; an outer case 27, which is installed outside the bottom case 20 and the fulcrum piece 24 and has a transparent cover body 28 installed on top of the outer case 27.

According to the configuration of aforementioned structure, a complete pressure gauge 2 can be composed. In addition, the simple and concise structure can achieve excellent stability, robustness and high practicality.

Figure 4:
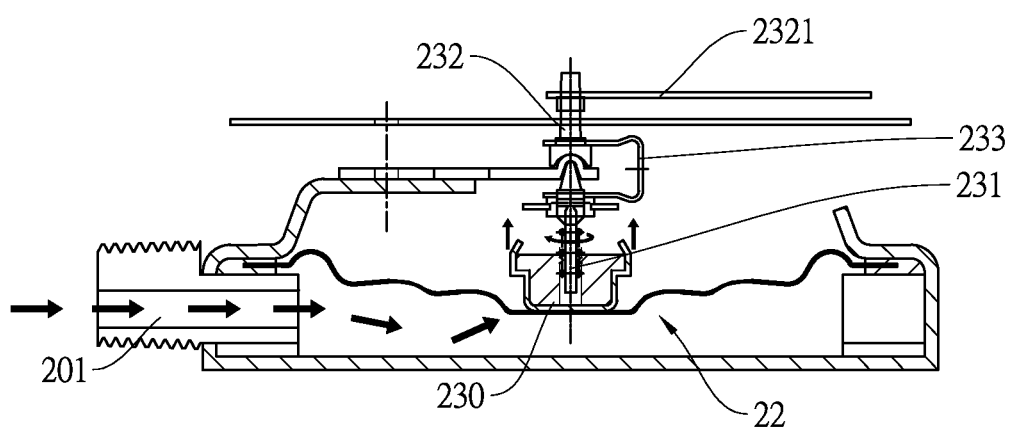
FIG. 4 is a schematic sectional view of pressure measurement implementation of the improved structure of pressure gauge of the invention.

Referring to FIG. 4 in conjunction with FIG. 3, as gas enters through the pipeline 201, pressure is generated and forces the pressure measurement assembly 22 and the sleeve body 230 thereon to move upward together. At the same time, the pressure also pushes the protruding knobs 2301 to slide along the thread part 2311, as a result, causing the central rod 231 to rotate. Furthermore, through the rotating piece 233 that is connected to the central rod 231, the pointer rod 232 starts to rotate and drives the pointer 2321 to rotate and direct the current pressure value wherein the spiral part 2311 utilizes the double-threaded thread, which is formed by winding two wires around the same rod, so that the manufacturing process is much simpler; the cost is lesser; the structure is much robust and not easy to get damaged.

Figure 5:
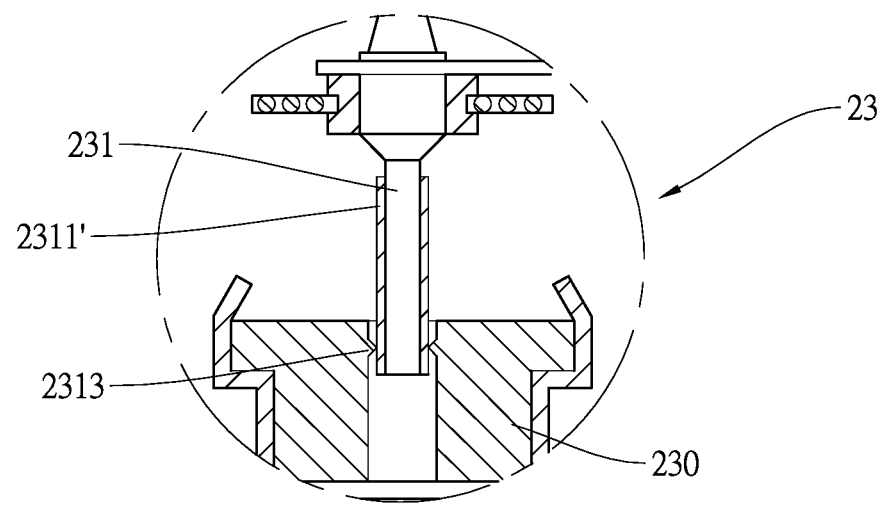
FIG. 5 is a schematic sectional view of another implementation of the rotating assembly of the improved structure of pressure gauge of the invention.

Referring to FIG. 5 in conjunction with FIG. 2, the rotating assembly 23 of the improved structure of pressure gauge of the invention can be a different form. The main differences are that the inside of the sleeve body 230 is formed with a spiral part 2313 of a spiral shape; the side skirt of the central rod 231 has a thread part 2311' (threads being directly processed onto the central rod 231) to be spirally screwed in the spiral part 2313. Thus, the sleeve body is suitably used in a pressure gauge of larger magnification ratios in measurement and more compact in device size.

In summary, the unique and special structure and design of the invention make components to interact to each other effectively within an extremely small space and can be applied to the measurement in many areas including diving depth, atmospheric pressure, vacuum, sea-level altitude, oil pressure and gas pressure.

Figure 6:
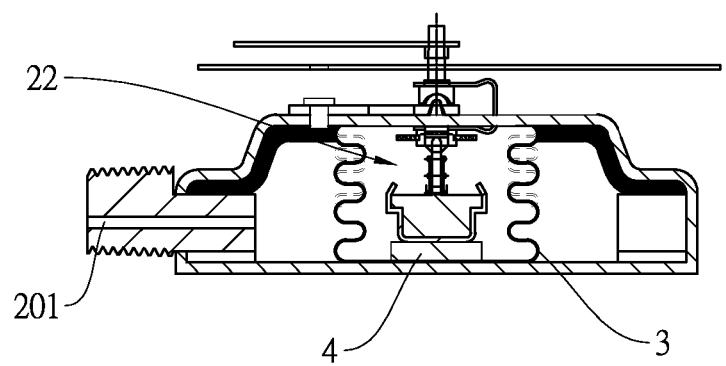
FIG. 6 is a schematic sectional view of the movement of the bellows of the improved structure of pressure gauge of the invention.

Referring to FIG. 6 in conjunction with FIG. 2, the pressure measurement assembly 22 of the pressure gauge 2 of the invention can be vertical bellows 3 and a pad block 4 can be installed underneath the bellows.

During the operation, as gas entered into the pressure gauge 2 through the pipeline 201, gas forces the bellows 3 to stretch. The bellows 3 is of high sensitivity and therefore can measure extremely low pressure (such as the atmospheric pressure).

In summary, the improved structure of pressure gauge of the invention has the following advantages:

Two protruding knobs of the sleeve body are spirally screwed into the thread part and the thread part then is driven by these two protruding knobs to rotate so that the force is applied thereon equally and more stably, and the accuracy of measurement increases.

The thread part uses a double-threaded thread, which is formed by winding two wires around the same rod, so that the manufacturing process is much simpler; the cost is lesser; the structure is much robust and not easy to get damaged.

The thread part uses a double-threaded thread, which is formed by winding two wires around the same rod, so that the transmission movement is more accurate.

The structure and design make components to interact to each other effectively within an extremely small space and can be applied to the measurement in many areas including diving depth, atmospheric pressure, vacuum, sea-level altitude, oil pressure and gas pressure.

The pressure measurement assembly can be vertical bellows and, due to the extremely high sensitivity of bellows, extremely low pressure can be measured.

The inside of the sleeve body is formed with a spiral part of a spiral shape; the side skirt of the central rod has a thread part to be spirally screwed into the spiral part, so that the sleeve body is suitably used in a pressure gauge of larger magnification ratios in measurement and more compact in device size.

While the invention has been described in terms of preferred embodiments, those skilled in the art will recognize that the invention can be practiced with modifications within the spirit and scope of the appended claims.

What is claimed is:

1. An improved structure of pressure gauge, comprising:
a bottom case, wherein a peripheral edge of the bottom case protrudes upward to form a ring base and the bottom case has a pipeline for gas to circulate wherein a seal pad is installed on the ring base around the peripheral edge of the bottom case;
a pressure measurement assembly, which is installed above the seal pad and is shaped with a plurality of concentric circular waves on the surface thereof;
a rotation assembly, which comprises a sleeve body and a central rod wherein the sleeve body is installed at and connected to the central location of the pressure measurement assembly; the inside of the sleeve body is formed with two protruding knobs; the central rod is plugged into the sleeve body; an outer surface of the central rod has a thread part; the upper area of the central rod is formed with a coil slot; and a top end of the central rod protrudes upward and is installed with a pointer rod; a rotating piece is used to drive the pointer rod; a pointer is installed on the pointer rod;
a fulcrum piece, which is installed across between the central rod and the pointer rod wherein the fulcrum piece has a plurality of through holes for installation and is formed with a coil retaining base at one end close to the central rod;

a coil spring, wherein one end of the coil spring is screwed onto the coil slot; the other end of the coil spring is installed on the coil retaining base;

a scale meter, which is installed between the pointer rod and the pointer, and has a through hole that is correspondent to the through hole on the fulcrum piece; and an outer case, which is installed outside the bottom case and the fulcrum piece and is covered with a transparent cover body thereon.

2. The improved structure of pressure gauge as claimed in claim 1, wherein the thread part is double-threaded and formed by winding two wires around the same rod.

3. The improved structure of pressure gauge as claimed in claim 1, wherein the pressure measurement assembly is a diaphragm.

4. The improved structure of pressure gauge as claimed in claim 1, wherein the pressure measurement assembly is bellows.

5. The improved structure of pressure gauge as claimed in claim 4, wherein a pad block is installed underneath the bellows.

6. An improved structure of pressure gauge, comprising:

a bottom case, wherein a peripheral edge of the bottom case protrudes upward to form a ring base and the bottom case has a pipeline for gas to circulate wherein a seal pad is installed on the ring base around the peripheral edge of the bottom case;

a pressure measurement assembly, which is installed above the seal pad and is shaped with a plurality of concentric circular waves on the surface thereof;

a rotation assembly, which comprises a sleeve body and a central rod wherein the sleeve body is installed at and connected to the central location of the pressure measurement assembly; the inside of the sleeve body is formed with a spiral part of a spiral shape; the central rod is plugged into the sleeve body; an outer surface of the central rod has a thread part; the upper area of the central rod is formed with a coil slot; and a top end of the central rod protrudes upward and is installed with a pointer rod; a rotating piece is used to drive the pointer rod; a pointer is installed on the pointer rod;

a fulcrum piece, which is installed across between the central rod and the pointer rod wherein the fulcrum piece has a plurality of through holes for installation and is formed with a coil retaining base at one end close to the central rod;

a coil spring, wherein one end of the coil spring is screwed onto the coil slot; the other end of the coil spring is installed on the coil retaining base;

a scale meter, which is installed between the pointer rod and the pointer, and has a through hole that is correspondent to the through hole on the fulcrum piece; and an outer case, which is installed outside the bottom case and the fulcrum piece and is covered with a transparent cover body thereon.

7. The improved structure of pressure gauge as claimed in claim 6, wherein the thread part is double-threaded and formed by winding two wires around the same rod.

8. The improved structure of pressure gauge as claimed in claim 6, wherein the pressure measurement assembly is a diaphragm.

9. The improved structure of pressure gauge as claimed in claim 6, wherein the pressure measurement assembly is bellows.

10. The improved structure of pressure gauge as claimed in claim 9, wherein a pad block is installed underneath the bellows.

\* \* \* \* \*